3,385,662
PROCESS FOR PREPARING SUBSTANTIALLY PYROPHOSPHATE-FREE DISODIUM PHOSPHATE, DUOHYDRATE
Fred McCollough, Jr., Chicago Heights, Ill., assignor to Stauffer Chemical Company, New York, N.Y., a corporation of Delaware
No Drawing. Filed May 1, 1963, Ser. No. 277,092
6 Claims. (Cl. 23—107)

The present invention pertains to a process for preparing a crystalline disodium phosphate, duohydrate which is substantially free of pyrophosphate impurities.

The usual commercial process used heretofore to prepare disodium phosphate, duohydrate, which comprised the initial reaction step of adding sodium carbonate to a large volume of orthophosphoric acid, resulted in the formation of a crystalline product having a significant proportion of pyrophosphate impurities. Although varying somewhat from run to run in the normal course of production, the pyrophosphate content would be above 0.05%, and often above 0.10%, by weight of the final product. It should be noted that any pyrophosphate present (mainly tetrasodium pyrophosphate) in the final product is formed in the reaction mixture during reaction between sodium carbonate and phosphoric acid. Once formed in the reaction mixture, the pyrophosphate cannot thereafter be removed by diluting the reaction mixture or lowering the temperature. Further, chemical removal of the pyrophosphate from the reaction mixture does not appear promising.

Disodium phosphate, duohydrate is today principally used as an emulsifier in the production of process cheese, as an enrichment ingredient in stock feed, and as an additive in the processing of meat. It is also useful in various pharmaceutical, textile, and water treatment applications. In some of these uses a small amount of pyrophosphate is not a serious disadvantage. Unfortunately, however, when disodium phosphate, duohydrate is used as the emulsifying agent in process cheese, perhaps its largest single use, pyrophosphate in the amounts formed under the above-mentioned process, can be highly detrimental to the quality of the cheese composition. Apparently, the pyrophosphate and orthophosphate tend to interact to produce a process cheese which is relatively hard, slow-melting, and having various other undesirable properties. Significantly, however, when the pyrophosphate content is below about 0.05% by weight of the disodium phosphate, duohydrate, the aforesaid, normally undesirable, cheese properties will be substantially, if not completely, eliminated.

An object of this invention is to furnish a process for preparing a substantially pyrophosphate-free crystalline disodium phosphate, duohydrate.

Another object is to furnish a substantially pyrophosphate-free disodium phosphate, duohydrate which is particularly suited to the emulsification of process cheese. Other objects will become apparent as the disclosure proceeds.

I have now discovered that a substantially pyrophosphate-free crystalline disodium phosphate, duohydrate may be prepared by controlling the reaction between sodium carbonate and phosphoric acid to produce a reaction mixture having at all times a relatively high pH, that is, a pH above 6.5, and a Baumé between 40° and 50°. In this regard, I have found that the rate of formation of pyrophosphate in a sodium carbonate-phosphoric acid reaction mixture is mainly influenced by the reaction mixture pH and Baumé. High pH, i.e., above about 6.5, and low Baumé, i.e., 50° or below, tend to inhibit the formation of pyrophosphate. A third variable, temperature, while relatively insignificant at the high pH's and low Baumé's of the present invention, has been found to influence "pyro" formation by the prior art process. Higher temperatures are commensurate with a faster rate of "pyro" formation.

In a broad sense, the process of the present invention may be said to comprise a "reverse addition" or "concurrent addition" of the initial reactants (sodium carbonate and phosphoric acid). Thus, it may involve either (1) adding phosphoric acid to a large volume of sodium carbonate (preferably a slurry), or (2) concurrently feeding sodium carbonate (preferably dry) and aqueous phosphoric acid into a reaction zone at a predetermined rate. By the first alternative, the pH of the reaction mixture will slowly decrease from its initially high value, e.g., the pH of a sodium carbonate slurry, about 10.5, to as low as 6.5. The Baumé of the reaction mixture is easily maintained within the desired limits by controlling the water content of the sodium carbonate slurry and/or phosphoric acid. By the latter alternative, the pH is maintained by the rate at which sodium carbonate and phosphoric acid are reacted. By this procedure, the Baumé of the reaction mixture can be controlled by the initial water content of the phosphoric acid, or by adding water to the reaction mixture. By both of these methods of addition, the final sodium carbonate-phosphoric acid reaction mixture will have an $Na_2O:P_2O_5$ ratio between 1.2 and 1.9, the higher ratio corresponding roughly to conditions where sodium carbonate and phosphoric acid will cease to react. The remaining sodium required to furnish the theoretical stoichiometric ratio of disodium phosphate ($Na_2O:P_2O_5=2.0$) will then be supplied by completing the reaction with sodium hydroxide.

A large portion of the $CO_2$ formed during the exothermic reaction between sodium carbonate and phosphoric acid will be liberated at the elevated reaction temperatures (normally between 60° and 100° C.). It may be desirable, however, to accelerate decarbonation of the solution by the application of external heating. In either event, in order to avoid fixing appreciable quantities of carbonate in the final product, it will be necessary to lower the $CO_2$ content to less than 1%, and preferably less than 0.5% by weight of the reaction mixture, before adjusting the $Na_2O:P_2O_5$ ratio to that of disodium phosphate. When the carbonate is so removed, the required amount of sodium hydroxide will be added. When this final reaction is complete, the disodium phosphate, duohydrate is crystallized from the resulting solution by vacuum evaporation of the same. The disodium phosphate liquor may, however, be filtered prior to crystallization to remove insolubles, if any are present.

In a preferred process, the pH of the reaction mixture is maintained at 7.0 or above and the Baumé between 42° and 46°. A pH of 7.0 corresponds to a reaction mixture containing an $Na_2O:P_2O_5$ ratio of approximately 1.5. Under such preferred conditions, the pyrophosphate content of the final product can be held below 0.01%.

The following specific examples will further illustrate the principles of the invention, but should not be interpreted as unduly limiting the scope thereof.

EXAMPLE 1

Ninety grams of sodium carbonate was slurried in 120 grams of distilled water. To this slurry was added 130 grams of 75% orthophosphoric acid, giving a pH of 7.0. After the evolution of $CO_2$ ceased, 12 grams of sodium hydroxide was then added to the reaction mixture. Maintaining the temperature between 70° and 80° C., the pH of the reaction mixture was adjusted to 8.6 with the further addition of sodium hydroxide. The liquor was then filtered, analyzed, and was found to contain no detectable pyrophosphate (analytical technique was limited to detecting pyrophosphate at 0.01% or above).

In order to compare the "reverse addition" process of Example 1 with the prior art process, disodium phosphate was prepared by the following procedure:

EXAMPLE 2

To 120 grams of distilled water was added 130 grams of 75% orthophosphoric acid. Ninety grams of dry sodium carbonate was then added to the dilute acid, followed, after $CO_2$ evolution ceased, by 12 grams of sodium hydroxide. Maintaining the temperature at between 70° and 80° C., the pH was adjusted to 8.6 with the addition of further amounts of sodium hydroxide. The resulting liquor was then filtered, analyzed, and found to contain 0.05% tetrasodium pyrophosphate.

EXAMPLE 3

Crystalline disodium phosphate, duohydrate, produced by a reaction procedure substantially in accordance with that described in Example 1, above, was used as the emulsifying agent in process cheese. In preparing the cheese, 300 grams of cheddar was first cut into fine pieces and placed in a Mirro aluminum double boiler. The boiler was then partly immersed in boiling water. The disodium phosphate, duohydrate was dissolved in distilled water and added to the cheese. The cheese was further heated in boiling water and steam to a temperature of about 140° F. The propeller of a Model L Lightnin mixer was then lowered into the double boiler and mixing started. The cheese was thereafter heated with stirring to 161–164° F. and finally poured into three 150 ml. metal beakers. After cooling, the cheese samples were stored in a refrigerator overnight. Upon evaluation, the cheeses were found to melt uniformly with no fat separation and exhibit a high degree of resiliency. A control sample of the same type cheese employing disodium phosphate, duohydrate having 0.05% tetrasodium pyrophosphate as the emulsifying agent was found to exhibit meltability and resiliency below the minimum standards of commercially acceptable melting cheeses.

EXAMPLE 4

Two disodium phosphate liquor solutions were prepared by adding disodium phosphate, anhydrous (pyrophosphate-free) to distilled water to give Baumés of about 46° and about 52°. These solutions were held at 90° C. and periodically sampled and analyzed by chromatograms to determine the percentage of pyrophosphate present. Results of this test are presented in the following table:

TABLE I

| | Percent Pyrophosphate | |
|---|---|---|
| | 46° Bé. | 52° Bé. |
| Time, hrs.: | | |
| 0 | Nil | Nil |
| 6 | Nil | Nil |
| 17 | Nil | 0.05 |

EXAMPLE 5

Into a large open vessel were metered, concurrently, dry sodium carbonate and 80% orthophosphoric acid. At frequent intervals, samples of the reaction mixture were taken and the pH determined. Corrections in the rate of addition of sodium carbonate and/or orthophosphoric acid were thereafter made to adjust the pH of the reaction mixture within the range of between 7.0 and 8.0. The Baumé of the reaction mixture was controlled by the addition of water to give a Baumé of about 45° to 47°. This procedure was continued until a large amount of disodium phosphate liquor was prepared. To complete decarbonation of the hot reaction mixture, steam was applied to a jacket on the reaction vessel. After decarbonation, sodium hydroxide was added to the liquor to adjust the $Na_2O:P_2O_5$ ratio to approximately 2.0. The phosphate liquor was then continuously fed to a large industrial-type vacuum evaporator for crystallization of disodium phosphate, duohydrate. The pyrophosphate content of the crystalline product was found upon chromatographic analysis to be below 0.05%.

As already alluded to hereinbefore, removal of the pyrophosphate impurity from the disodium phosphate, duohydrate after formation does not appear to be promising. Nevertheless, essentially all of the pyrophosphate can be removed by washing the duohydrate in cold water, indicating that the pyrophosphate resides on the surface of the crystals. While this procedure is sufficiently practicable for laboratory studies, its use on a large commercial scale would apparently be prohibited by the processing costs and the product losses.

Where reference is made herein and in the appended claims to a "substantially pyrophosphate-free crystalline disodium phosphate, duohydrate" it is meant that such material will comprise less than 0.05%, and preferably less than 0.01%, pyrophosphate, measured as tetrasodium pyrophosphate.

The foregoing detailed description has been given for clearness of understanding only, and no unnecessary limitations should be understood therefrom, as modifications will be obvious to those skilled in the art.

I claim:

1. A process for preparing substantially pyrophosphate free crystalline disodium phosphate, duohydrate comprising:
   (1) reacting phosphoric acid with sodium carbonate in proportions to furnish an $Na_2O:P_2O_5$ mole ratio of between 1.2 and 1.9;
   (2) maintaining the reaction mixture during the reaction at a Baumé between 40° and 50° and at a pH above 6.5 until the $CO_2$ content decreases to less than 1.0% by weight of the reaction mixture;
   (3) thereafter adjusting the $Na_2O:P_2O_5$ mole ratio of the reaction mixture to 2.0 with sodium hydroxide; and
   (4) crystallizing disodium phosphate, duohydrate from the reaction mixture whereby disodium phosphate, duohydrate having a pyrophosphate content of below 0.05% by weight is provided.

2. The process of claim 1 wherein the Baumé of the reaction mixture during the reaction between the phosphoric acid and sodium carbonate is maintained between 42° and 46°.

3. The process of claim 1 wherein the pH of the reaction mixture during the reaction between the phosphoric acid and sodium carbonate is maintained between 7.0 and 9.0.

4. A process for preparing substantially pyrophosphate-free crystalline disodium phosphate, duohydrate which comprises slowly passing phosphoric acid into a relatively large volume of an aqueous slurry of sodium carbonate in proportions to produce a reaction mixture having a Baumé between 42° and 46° and an $Na_2O:P_2O_5$ mole ratio between 1.2 and 1.9, decreasing the $CO_2$ content of said reaction mixture to less than 1.0% by weight of said reaction mixture while maintaining said reaction mixture at said Baumé between 42 and 46°, adjusting the $Na_2O:P_2O_5$ mole ratio to 2.0 with sodium hydroxide, and crystallizing disodium phosphate, duohydrate from the reaction mixture by evaporation whereby disodium phosphate, duohydrate having a pyrophosphate content of below 0.05% by weight is provided.

5. A process as recited in claim 1 wherein said reaction mixture is formed by concurrently feeding dry sodium carbonate and aqueous phosphoric acid into a reaction zone at a predetermined rate sufficient to maintain said Baumé range, said $Na_2O:P_2O_5$ mole ratio, and said pH.

6. The process of claim 5 wherein the Baumé of the reaction mixture during the reaction between the phosphoric acid and sodium carbonate is maintained between 42° and 46°.

(References on following page)

References Cited

UNITED STATES PATENTS

| | | | |
|---|---|---|---|
| 1,984,146 | 12/1934 | Lindberg | 23—107 |
| 1,998,182 | 4/1935 | Anable et al. | 23—107 |
| 2,251,496 | 8/1941 | Parsons | 99—116 |
| 2,390,400 | 12/1945 | Taylor | 23—107 |
| 2,564,374 | 8/1951 | Roland | 99—116 |
| 2,977,190 | 3/1961 | Yates et al. | 23—107 |
| 3,055,735 | 9/1962 | Suzuki et al. | 23—107 |
| 3,081,151 | 3/1963 | Marty | 23—107 |
| 3,086,844 | 4/1963 | Beltz | 23—107 |

OTHER REFERENCES

Van Wazer: Phosphorus and its compounds, vol. II, Interscience Publishers, Inc., New York 1961, pp. 1010–1011 and 1632–1639.

OSCAR R. VERTIZ, A. LOUIS MONACELL, *Examiners.*

L. A. MARSH, O. F. CRUTCHFIELD, D. M. STEPHENS, *Assistant Examiners.*